Aug. 12, 1969 — L. C. WEATHERS — 3,460,577

SPOOL TYPE VALVE

Filed June 24, 1966 — 2 Sheets-Sheet 1

INVENTOR.
LELAND CLAY WEATHERS
BY
ATTORNEYS

United States Patent Office 3,460,577
Patented Aug. 12, 1969

3,460,577
SPOOL TYPE VALVE
Leland Clay Weathers, Plymouth, Mich., assignor to Sperry Rand Corporation, Troy, Mich., a corporation of Delaware
Filed June 24, 1966, Ser. No. 560,195
Int. Cl. F16k 11/07, 11/02
U.S. Cl. 137—625.69
19 Claims

ABSTRACT OF THE DISCLOSURE

A valve for controlling the flow of fluid pressure between a plurality of spaced apart ports formed within a bore by means of a land formed on a spool reciprocally mounted therein, the land having a continuous threaded groove formed about its periphery in which fluid pressure will continuously flow therethrough for hydrostatically maintaining the land in a concentric relationship to the bore.

---

The present invention relates to a spool type valve for controlling flow between a supply pressure port and one or more control or utility ports.

Presently, spool type valves having a spool with lands slidably fitted to a valve bore are susceptible to a condition known as hydraulic lock or pressure bind, wherein the spool becomes hydraulically locked in the bore. This condition generally occurs when the valve spool has remained in a static position for a period of time with supply pressure continuously applied to the spool. The higher the supply pressure, the shorter the time before the spool becomes locked. Locking occurs as a result of lateral hydraulic forces shifting the spool radially within the bore. The magnitude of the lateral hydraulic forces is a function of the supply pressure. When surface to surface contact occurs between the periphery of the spool land and the surface of the bore, the spool becomes locked. The lateral hydraulic forces on the spool and the imperfections of the surfaces in contact causes the spool to remain locked. The force necessary to unlock the spool is a function of the lateral hydraulic force and surface imperfections of the surfaces in contact. This force may be relatively large as compared to the force necessary to move the spool under ordinary operating conditions. Once the spool is unlocked, the force required to move the spool must be sufficient to overcome viscous drag and fluid flow forces which tend to resist spool motion. The latter force is commonly referred to as "Bernoulli" forces. Viscous drag is a force which resists spool motion due to the shear stress of the fluid between the spool land periphery and the surface of the bore. The fluid flow forces or "Bernoulli" forces are due to the high velocity of fluid flowing from the pressure port to the control port when the valve is opened, and are in a direction tending to close the valve.

In the past, valve manufacturers have endeavored to eliminate spool bind by extremely careful and expensive machining of spools and bores to minimize surface irregularities, by holding spool-to-bore clearance to such extremely close tolerances that selective assembly was required, and by the use of a plurality of discrete, annular, so-called balancing grooves extending circumferentially around the spool lands. Despite this, the problem of spool bind has persisted.

It is an object of this invention to provide a spool type valve with a spool that is hydrostatically held concentric within its bore.

Another object of this invention is to reduce the force required to move the valve spool from a closed position to an open position.

Another object of the present invention is to provide a valve spool which is inexpensive to manufacture.

More specifically this invention relates to a spool type valve wherein the lands of the spool are threaded to provide grooves in which fluid is carried for hydrostatically maintaining the spool concentric within its bore.

Further objects and advantages of this invention will be apparent in the following description reference being had to the accompanying drawings wherein a preferred form of the present invention is clearly shown.

IN THE DRAWINGS

Figure 1:
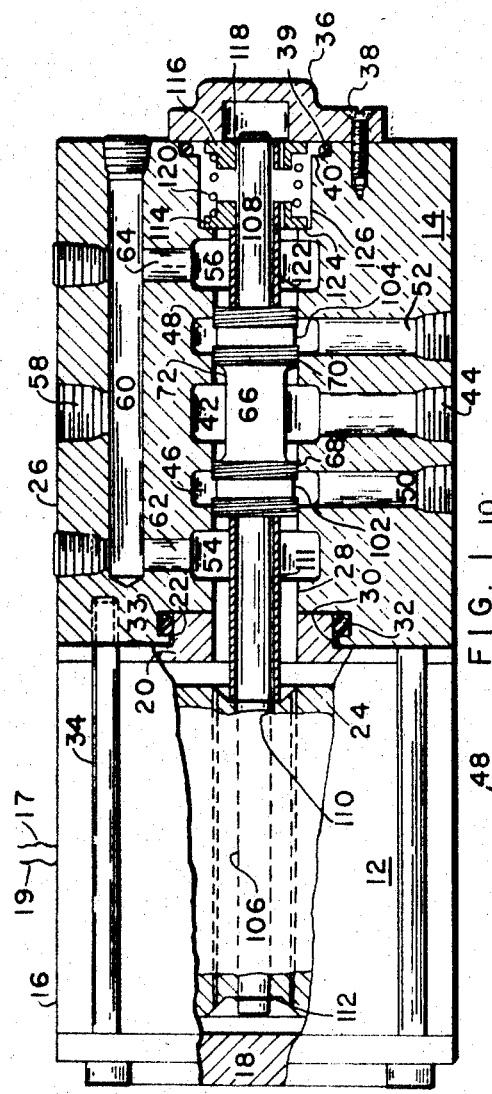
FIG. 1 is a partial sectional view of a directional control valve assembly embodying the present invention.

Referring to FIG. 1, a valve assembly 10 comprises a solenoid 12 and a valve 14. The solenoid 12 has a body 16 and end plates 18 and 20. End plate 20 is provided with a pilot shoulder 22 which extends into the valve 14. An armature 24, movable longitudinally between the end plates 18 and 20, is assembled within the solenoid body and is surounded by a conventional winding having leads 17 and 19 extending from the body 16. The valve 14 has a valve body 26. A cylindrical bore 28 extends longitudinally through the valve body 26. At the end of bore 28, adjacent solenoid 12, there is a pilot counter-bore 30 which is engaged by pilot shoulder 22. An O-ring 32 retained in an annular groove 33 in counterbore 30 engages pilot shoulder 22, providing a seal to prevent leakage from bore 28. Solenoid 12 is firmly supported on valve body 26, and attached thereto by bolts 34 threaded in the valve body 26 as shown. An end cap 36 is attached to the end of valve body 26 opposite the solenoid 12 by a plurality of screws 38. An O-ring 39 in groove 40 engages end cap 36 preventing leakage of fluid from bore 28.

The cylindrical bore 28 is provided with a plurality of annular grooves spaced along its length. Annular groove 42 constitutes the pressure port of the valve 14 and is connected to the exterior of valve body 26 by passage 44. Equally spaced on each said of the pressure port 42 are annular grooves forming control ports 46 and 48, each being connected to the exterior of valve body 26 by passages 50 and 52. A pair of tank ports 54 and 56, formed by the annular grooves located longitudinally outwardly of control ports 46 and 48, are connected to a common return port 58 by a longitudinal passage 60 and transverse passages 62 and 64 respectively. Passages 60, 62, and 64 are of a predetermined size to provide a slight restriction to fluid flow between tank ports 54 and 56 and return port 58.

Figure 3:
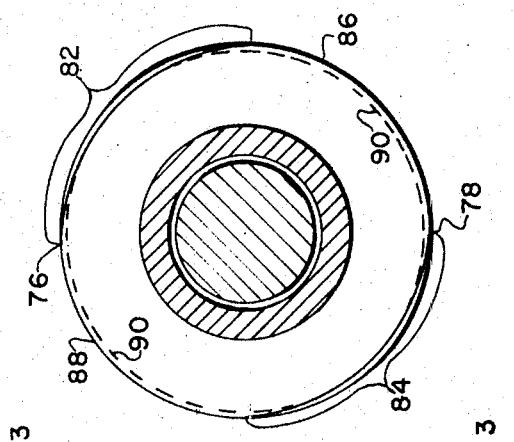
FIG. 3 is a sectional view taken along the line 3—3 in FIG. 2.
Figure 2:
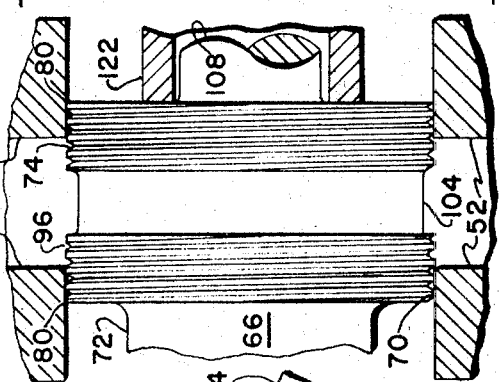
FIG. 2 is an enlarged fragmentary sectional view of a portion of the valve shown in FIG. 1.

A cylindrical spool 66 is slidable in bore 28 and is provided with lands 68 and 70 separated by a reduced cylindrical section 72. Each land 68 and 70 is provided with a double thread 74 about its periphery, as shown in FIGS. 2 and 3. Referring now to FIG. 3, each thread of the double thread is stated at diametrically opposed points 76 and 78 on the periphery of each land 68 and 70. As the first part of each thread of the double thread 74 is formed, two diametrically opposed 90 degree portions of the edges 80 of the lands 68 and 70 are removed, thus forming chamfers 822 and 84. The remaining portions 86 and 88 of the edge 80 remain intact as a sharp edge. This edge configuration is the same for each edge 80 of lands 68 and 70. The dotted line 90 in FIG. 3 represents the root diameter of the double thread 74.

Figure 4:
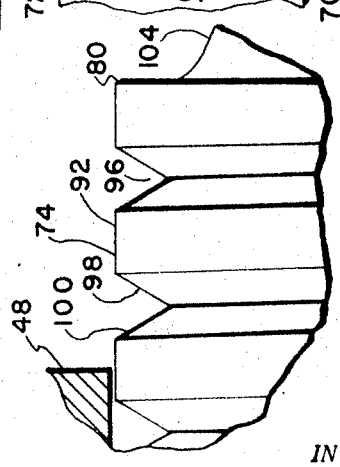
FIG. 4 is a fragmentary view on an enlarged scale of a portion of FIG. 2.

As shown in FIG. 4 the crest 92 of each thread of the double thread is flat forming a cylindrical surface, the diameter of which is approximately equal to the pitch diameter of the double thread. The width of the crest 92 is equal to approximately one half the distance between corresponding points on adjacent threads. A groove 96 is formed by the sides 98 and 100 of adjacent threads of the double thread 74. The width of each groove 96 is substantially equal to the width of the crest 92 of each thread of the double thread when measured at the cylindrical surface of the lands 68 and 70. For a spool having a land diameter of approximately .688 inch, the width of the crest and groove is approximately .0078 inch and a groove depth of approximately .0068 inch. Each land 68 and 70 has an annular groove 102 and 104, respectively, dividing the threaded periphery of each land 68 and 70 into equal spaced parts. This is an optional feature and is provided primarily for the purpose of relieving the length of the thread land surface. When the spool 66 is in a central or closed center position, as shown in FIG. 1, lands 68 and 70 completely cover control ports 46 and 48 respectively. The length of each land 68 and 70 is such that each land extends equally on each side of its corresponding control port. This is commonly referred to as an overlap condition.

The spool 66 is provided with two cylindrical extension rods 106 and 108 adjacent to lands 68 and 70 respectively. Extension rod 106 extends through a hole 110 in armature 24. A spacer sleeve 111 encircles extension rod 106 and spaces armature 24 from land 68 such that the armature 24 is equally spaced between the end plates when the spool is in its closed center position. A snap ring 112 retains the armature and spacer sleeve 111 on the extension rod 106. Extension rod 108 extends from land 70 through two spring tubes 114 and 116 which are retained on extension rod 108 by a snap ring 118. A compression spring 120 is interposed between the spring guides 114 and 116. A spacer sleeve 122 encircles extension rod 108 and separates land 70 and spring guide 114. The spring 120 is precompressed to force spring guide 114 to abut a shoulder 124 formed by a circular counter bore 126, and spring guide 116 to abut end cap 36, and thus serves to bias the spool 66 to its closed center position.

In operation, fluid at supply pressure is applied to pressure port 42 through passage 44. When the spool 66 is in its closed center position as shown in FIG. 1, the spool lands 68 and 70 hydraulically block control ports 46 and 48 respectively. In this position the spool lands 68 and 70 are hydrostatically maintained in concentric relation to the valve bore 28. Supply pressure fluid enters the grooves 96 of the double thread 74 through the chamfered areas 82 and 84 at the end of each land 68 and 70 adjacent the pressure port 42. The fluid flows continuously from the pressure port 42 to each of the control ports 46 and 48 or to tank ports 54 and 56 in each of the grooves 96 of the double thread 74 around the periphery of each land 68 and 70. This flow is in the nature of leakage, but because of the long flow path which the grooves 96 provide around the periphery of the lands 68 and 70, is relatively insignificant in quantity. Thus, as long as a fluid supply pressure is applied at port 42, there will exist a slight fluid flow in the thread grooves 96 regardless of whether the spool 66 is in a closed or open position. In addition to the fluid flow in the threaded grooves 96, there is a slight fluid flow from each of the grooves 96 across the crest 92 of the thread to an adjoining groove 96, due to the slight pressure differential which exists between these adjoining grooves 96. The pressure of the fluid in the grooves 96 around the cylindrical periphery of the lands 68 and 70 provides equalized lateral hydraulic forces between the lands 68 and 70 and the surface of the bore 28. These hydraulic forces maintain the spool lands 68 and 70 in concentric relation to the valve bore 28 and thereby prevent hydraulic lock regardless of the magnitude of the supply pressure.

When the spool 66 is actuated to either of its open positions, directional flow control is achieved. For example, when spool 66 is actuated to the right, land 70 opens control port 48 to pressure port 42 and land 68 opens control port 46 to tank port 54. Thus, supply pressure fluid is directed to control port 48, which may be connected to some type of a load device such as a fluid motor (not shown). The return fluid from the load is directed from control port 46 to the tank port 54, where from it is returned to a reservoir (not shown) through passages 62 and 60 and return port 58. Similarly, if spool 66 is actuated to the left, control port 46 is put in communication with pressure port 42 and control port 58 is put in communication with tank port 56.

As spool 66 is actuated from its closed center position to one of its open positions, two different hydraulic forces are exerted upon the spool which assist in moving the spool in the direction initially actuated. These forces substantially cancel the effect of the opposing "Bernoulli" or flow forces and thus reduce the force necessary to actuate spool 66 to an open position. For example, as the spool is moved toward the right, but before the outer edge 80 of land 68 reaches the outer edge of central port 46 the chamfered sections 82 and 84 of edge 80 of land 68 provides a restricted communication between control port 46 and tank port 54. This restricted communication forms in essence a pair of fluid nozzles between the control port 46 and the tank port 54. Fluid flowing through these nozzles produces a jet reaction force on spool 66 assisting the force which initiated spool motion.

The other force is obtained by providing a predetermined flow restriction in passages 62, 64, and 60. For example, as the spool 66 is moved to the right, return flow from control port 46 will flow to tank port 54 and continue through passages 62 and 60 to return port 58. A pressure differential is thereby created between tank port 54 and return port 58. Since tank port 56 is blocked by land 70, there is no fluid flow between tank port 56 and return port 58 and, therefore, no pressure differential. Thus, the fluid pressure in tank port 54 is higher than that in tank port 56. This pressure differential provides a hydraulic force on the end of the land 68 exposed to tank port 54. Similarly, when the spool is moved in the opposite direction, a similar result is achieved but in the opposite direction. This force provides pressure compensation of spool 66 and assist the jet reaction force in moving the spool 66 in the direction initially actuated.

Figure 5:
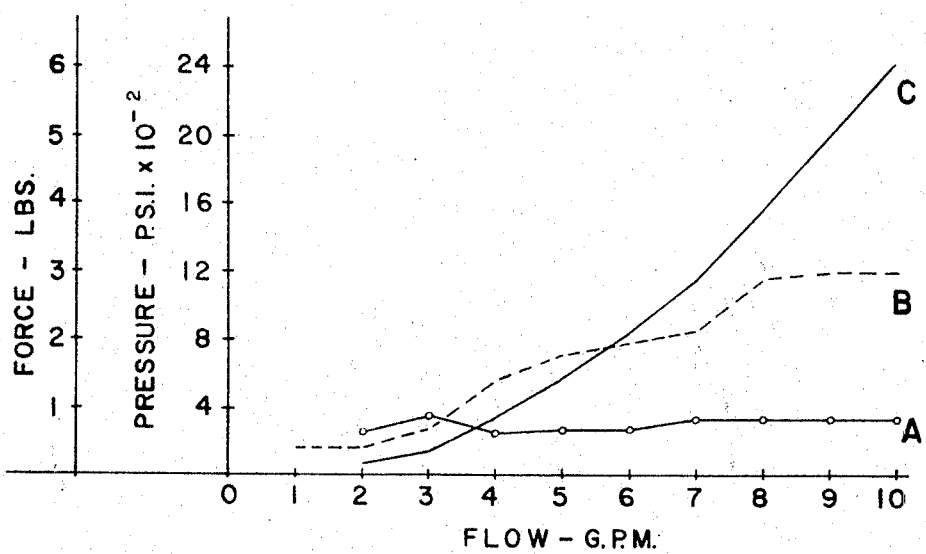
FIG. 5 shows performance curves of a valve embodying the present invention compared with that of a conventional valve and illustrates the forces required to move the spools when various supply pressures are supplied to the valve.

The maximum force required to move a valve spool from the closed center position to an open position is plotted in FIG. 5. The figure shows a comparison of the forces required to move a spool which incorporates the present invention and a spool which does not. The test valve did not include the spring 120, inasmuch as the spring force is an extraneous constant for either spool.

Curve A of FIG. 5 represents the maximum force required to move spool 66 from the closed centered position to an open position at varying supply pressures applied to pressure port 42. The supply pressure necessary to achieve the various flow rates at which the maximum force was recorded is illustrated by Curve C. For example, the maximum force to move the spool was measured for each flow setting from 2 g.p.m. to 10 g.p.m. at 1 g.p.m. intervals and the pressure necessary to provide the particular flow rate was recorded. The maximum force required to move the spool did not exceed one-pound at any given supply pressure. As Curve A illustrates, the force required to move spool 66 was substantially constant throuhgout the pressure range of the valve, thus illustrating that the forces needed to move the spool is substantially unaffected by variations in supply pressure.

Curve B of FIG. 5 represents the maximum force required to move a spool similar to spool 66 but which does not incorporate the present invention. As is apparent, the force required to move this spool increases as the supply pressure is increased.

It will thus be seen that the invention herein disclosed provides a unique means of preventing hydraulic lock by hydrostatically maintaining the spool in concentric relation to the bore regardless of the longitudinal position of the spool within the bore or the magnitude of the supply pressure. It will further be seen that this invention provides a marked reduction in the force necessary to move the spool from a closed position to an open position which is unaffected by the magnitude of the supply pressure. In addition, it will be seen that this invention reduces the necessity of precision in maintaining extremely close diametrical clearances and concentricities between the spool lands and valve bore. More specifically, it will be seen that this invention concerns the use of a thread about the periphery of a valve spool land for maintaining the valve spool land in concentric relation within the valve spool bore, and even more specifically the use of a double thread for obtaining maximum effectiveness.

What is claimed is as follows:

1. In a spool type valve, the combination comprising a body having a bore, said body having a pair of longitudinally spaced apart ports in communication with said bore, a spool slidable in said bore, said spool having a land interposed between said ports, and a double thread about the periphery of said land forming continuous grooves connecting said ports whereby, when fluid pressure is applied to one of said ports, fluid will continuously flow in said grooves to said other port to hydrostatically maintain said land in concentric relation to said bore.

2. The combination as defined in claim 1, wherein the crest of said thread is flat, forming a cylindrical surface parallel to the axis of said land.

3. The combination as defined in claim 2, wherein the width of said crest is equal to substantially one-half the distance between corresponding points on adjacent threads.

4. The combination as defined in claim 1, wherein said double thread is started at points diametrically opposed on the periphery of said land.

5. The combination as defined in claim 1, wherein the crest of said double thread is flat, forming a cylindrical surface parallel to the axis of said land, the width of said crest being equal to substantially one-half the distance between corresponding points on adjacent threads.

6. In a spool type valve the combination comprising a body having a cylindrical bore, said body having a control port on each side of a pressure port, said ports being in communication with said bore, a spool movable in said bore and having a pair of lands spaced apart, said spool having a central position when said lands are individually interposed between said pressure port and said control ports, and a double thread about the periphery of said lands forming continuous grooves communicating said pressure port with each of said control ports, whereby when fluid pressure is applied to said pressure port, fluid will flow continuously around the periphery of said land in said grooves to hydrostatically maintain said lands in concentric relation to said bore.

7. The combination as defined in claim 6, wherein said double thread is started at points diametrically opposed on the periphery of said lands.

8. The combination as defined in claim 6, wherein the length of said lands is larger than the width of said control ports.

9. The combination as defined in claim 8, wherein said lands extend equally on each side of said control ports when said spool is in said central position.

10. The combination defined in claim 9, wherein a pair of tank ports communicate with said bore longitudinally outwardly of said control ports, each of said tank ports being individually in fluid communication by a flow restrictive means with a common return port, said spool having pressure effective areas in communication with said tank ports such that actuation of said spool from said central position communicates said pressure port with one of said control ports, and communicates the other of said control ports with one of said tank port, whereby fluid flow from said tank port to said common return port produces a pressure differential between said tank ports which acts on said pressure effective areas of said spool tending to move said spool in the direction initially actuated.

11. In a spool type valve, the combination comprising a body having a bore, said body having a pair of longitudinally spaced apart ports in communication with said bore, a spool slidable in said bore, said spool having a land interposed between said ports, and a double thread between the periphery of said land and said bore forming continuous grooves connecting said ports, when fluid pressure is applied to one of said ports, fluid will continuously flow in said grooves to said other port to hydrostatically maintain said land in concentric relation to said bore.

12. In a spool type valve, the combination comprising a body having a cylindrical bore, said body having a control port on each side of a pressure port, said ports being in communication with said bore, a spool movable in said bore, and having a pair of lands spaced apart, said spool having a central position when said lands are individually interposed between said pressure port and said control ports, and a double thread between the periphery of said lands and said bore forming continuous grooves communicating said pressure port with each of said control ports, fluid will flow continuously around the periphery of said lands in said grooves to hydrostatically maintain said lands in concentric relation to said bore.

13. In a spool type valve for controlling the flow of pressure fluid, the combination comprising a body having a bore formed therein, said body having a pair of longitudinally spaced apart ports in communication with said bore; a spool slidable in said bore, said spool having a land formed thereon which will substantially restrict the flow of pressure fluid between said ports during one mode of operation and which will permit relatively unrestricted fluid communication between said ports during a second mode of operation, and a double thread formed between the periphery of said land and said bore, forming continuous grooves in which fluid pressure continuously flows therethrough to hydrostatically maintain said land in concentric relation to said bore during both modes of operation.

14. The combination as defined in claim 13 wherein said double thread between said land and said bore is formed about the periphery of said land forming said continuous groove thereon.

15. In a spool type valve for controlling the flow of fluid pressure, the combination comprising a body having a cylindrical bore formed therein, said body having a pressure port and a pair of control ports longitudinally spaced apart and in fluid communication with said bore, said control ports being on opposite sides of said pressure port; a spool movable in said bore having a pair of spaced apart lands formed thereon which will substantially restrict the flow of pressure fluid between said ports during one mode of operation and which will permit relatively unrestricted fluid communication between one of said control ports and said pressure port while substantially restricting communication between the other of said control ports and said pressure port during a second mode of operation; and a thread formed between the periphery of each of said lands and said bore forming a continuous groove between each land and bore in which fluid pressure continuously flows therethrough to hydrostatically maintain said lands in concentric relation to said bore during both modes of operation.

16. The combination as defined in claim 15 wherein said thread between each of said lands and bore is a double thread.

17. The combination as defined in claim 15 wherein said thread between each of said lands and bore is formed about the outer periphery of each of said lands forming said contiunous grooves thereon.

18. The combination as defined in claim 17 wherein said thread formed on each of said lands is a double thread.

19. In a spool type valve the combination comprising: a body having cylindrical bore, said body having a control port on each side of a pressure port, said ports being in communication with said bore; a spool movable in said bore and having a pair of lands spaced apart, said spool having a central position when said lands are individually interposed between said pressure port and said control ports, said lands having a length which is larger than the width of said control ports, said lands extending equally on each side of said control ports when said spool is in said central position, and a thread about the periphery of said lands forming a continuous groove communicating said pressure port with each of said control ports, whereby, when fluid pressure is applied to said pressure port, fluid will flow continuously around the periphery of said sand in said groove to hydrostatically maintain said lands in concentric relation to said bore; a pair of tank ports communicating with said bore longitudinally outwardly of said control ports, each of said tank ports being individually in fluid communication by a flow restrictive means with a common return port; said spool having pressure effective areas in communication with said tank ports such that actuation of said spool from said central position communicates said pressure port with one of said control ports, and communicates the other of said control ports with one of said tank ports, whereby, fluid flow from said tank port to said common return port produces a pressure differential between said tank ports which acts on said pressure effective areas of said spool tending to move said spool in the direction initially actuated.

References Cited
UNITED STATES PATENTS

| | | | |
|---|---|---|---|
| 525,462 | 9/1894 | Jones | 137—625.69 |
| 2,324,360 | 7/1943 | Camerota | 138—43 |
| 2,402,729 | 6/1946 | Buchanan | 138—43 |
| 2,447,920 | 8/1948 | Terry | 138—43 |

HENRY T. KLINKSIEK, Primary Examiner

R. J. MILLER, Assistant Examiner

U.S. Cl. X.R.

138—42